Oct. 12, 1965  J. B. GARRISON  3,212,084
SYSTEM FOR SIMULTANEOUSLY DISPLAYING A PLURALITY OF RADAR
IMAGES IN MORE THAN ONE DIMENSION
Filed Nov. 7, 1963  4 Sheets-Sheet 1

JOHN B. GARRISON
INVENTOR.

BY
Claude Funkhouser
ATTORNEY

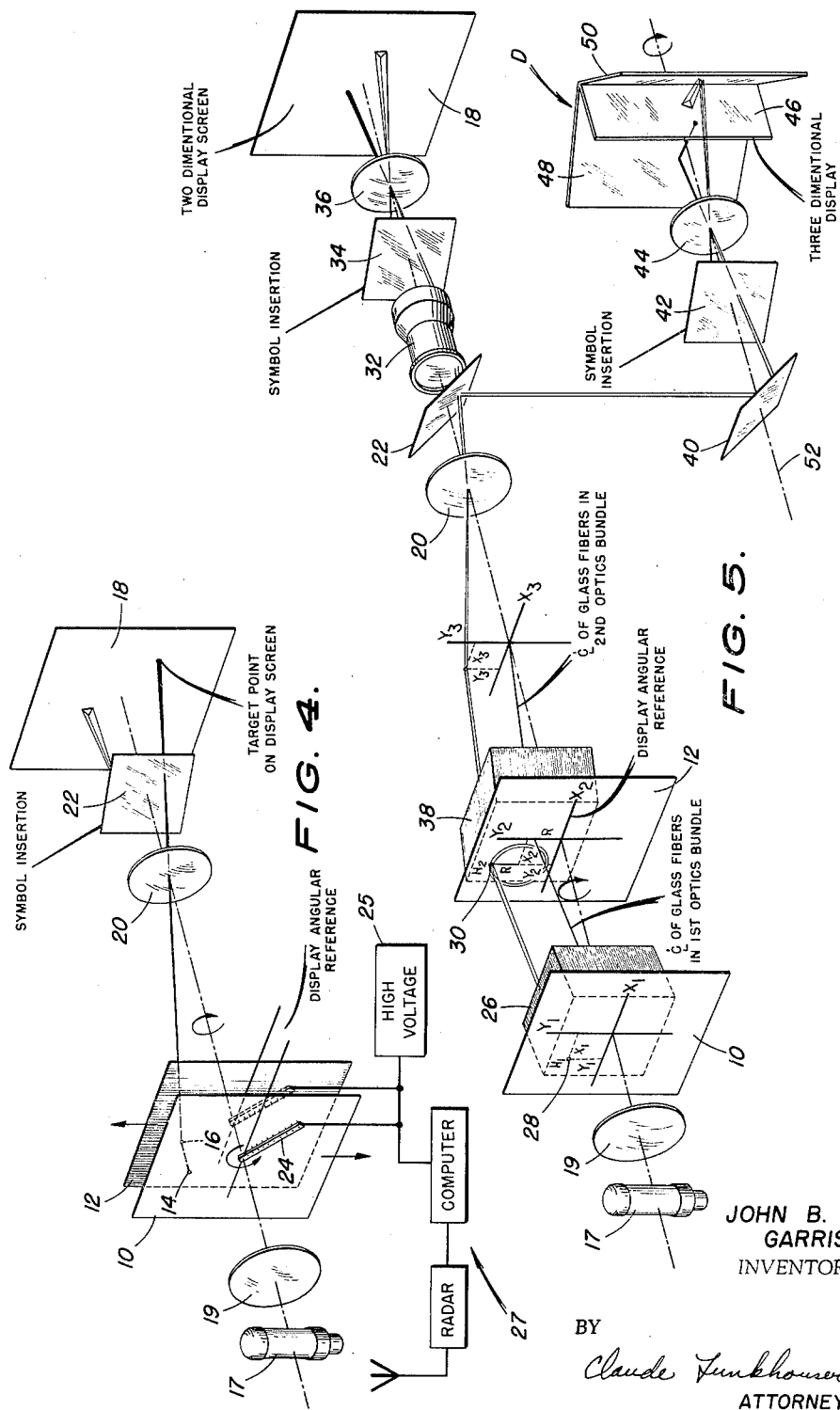

Oct. 12, 1965
J. B. GARRISON
3,212,084
SYSTEM FOR SIMULTANEOUSLY DISPLAYING A PLURALITY OF RADAR
IMAGES IN MORE THAN ONE DIMENSION
Filed Nov. 7, 1963
4 Sheets-Sheet 3
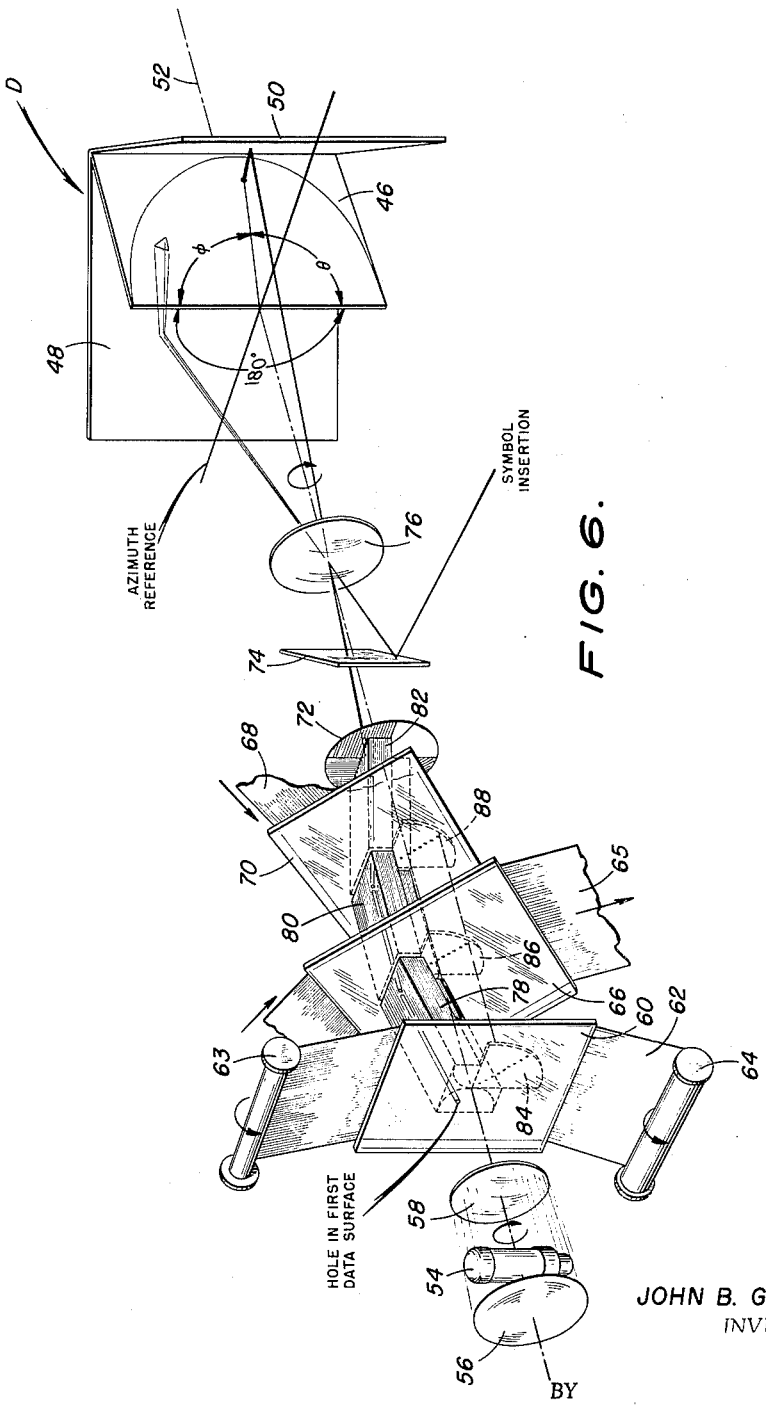
JOHN B. GARRISON
INVENTOR.
BY Claude Funkhouser
ATTORNEY

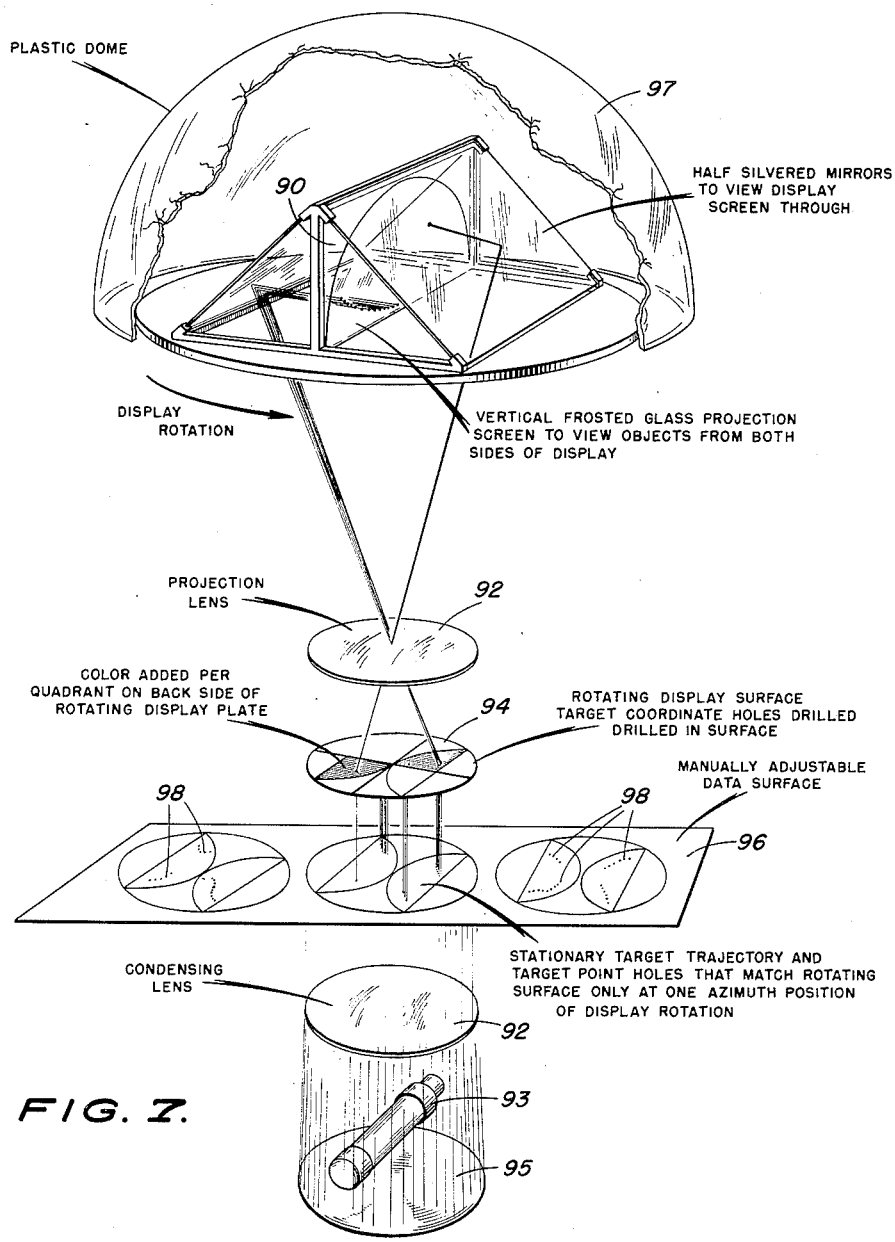

United States Patent Office 3,212,084
Patented Oct. 12, 1965

3,212,084
SYSTEM FOR SIMULTANEOUSLY DISPLAYING A PLURALITY OF RADAR IMAGES IN MORE THAN ONE DIMENSION
John B. Garrison, Silver Spring, Md., assignor to the United States of America as represented by the Secretary of the Navy
Filed Nov. 7, 1963, Ser. No. 322,259
20 Claims. (Cl. 343—7.9)

The present invention relates in general to optical display systems and more particularly to a radar display system capable of simultaneously displaying in three dimensions a plurality of targets along with a portion of their flight paths.

Radar technology has advanced to the stage of development where a single radar has been developed that can simultaneously and automatically search for, acquire and track with precision a large number of aircraft, providing accurate data as to their dimensional positions and velocities. Such a radar system is described in U.S. patent application Serial No. 20,231 filed April 5, 1960, John B. Garrison, inventor, and U.S. patent application Serial No. 266,113, filed March 18, 1963, John B. Garrison, inventor.

Many attempts have been made to date to produce a three dimensional radar display that is free from ambiguities, capable of handling a plurality of targets and yet relatively simple in construction and operation. Many of these attempts can be characterized by the variant use of a cathode ray tube as the basic means for image production. These prior art systems are limited in resolution by a factor less than that attributed to the standard cathode ray tube, and are of such complexity as to render them little better than other methods of display.

The instant invention provides a three dimensional display which is based entirely on optical principles of operation.

High speed digital computers that can assimilate large volumes of coordinate information from such radars and from other data gathering devices permit the construction of integrated automatic data gathering, processing and decision making control systems.

However, it will prove impossible to predetermine all possible operational situations in air traffic environments of increasingly high density and speed and to supply the answers that will be required by such systems. Consequently, there exists a requirement to develop new visual display devices that can work with advanced data-gathering equipment. Such devices must display quantities of coordinate data in a form suitable for rapid, intelligent monitoring and evaluation by a trained operator in order to allow him to override the automatic control system in times of malfunction or when it is confused by a particular operational situation.

Because we see the world in three dimensions, it is natural that a three dimensional display will provide an operator with information that he can assimilate and evaluate intelligently in the shortest possible time. Furthermore, in a heavily populated, high speed air situation, it will be highly advantageous for an operator to watch only one display for all his information rather than to be forced to make a composite mental picture from several two dimensional displays, each giving only two categories of information. The higher the degree of saturation and the higher the air traffic speeds, the more critical will be the need for this equipment.

It is therefore an object of the present invention to provide a radar display system capable of simultaneously displaying a plurality of targets in three dimensions.

It is another object of the instant invention to provide a three dimensional radar display which is capable of handling a large volume of information and displaying that information with accuracy and with high resolution.

It is a further object of the present invention to provide a three dimensional radar display which is able to present a controllable time history of a particular situation.

It is still another object of the present invention to provide a three dimensional radar display which is based exclusively on optical rather than electrical principles of operation.

It is still a further object of the present invention to provide a three dimensional radar display which is capable of performing the key functions of a general-purpose display system for both advanced weapon and commercial in-traffic control systems.

Another object of the present invention is to provide a three dimensional radar display which may be used in conjunction with sonar to display simultaneously both sub-surface and surface tactical military situations for evaluation.

Other objects and many of the attendant advantages of this invention will be readily appreciated as the same becomes better understood by reference to the following detailed description when considered in connection with the accompanying drawings, wherein:

FIG. 4 is a schematic representation of a two dimensional radar display;

FIG. 5 is a view somewhat similar to FIG. 4 but showing a three dimensional display;

FIG. 6 is a schematic view showing a modified three dimensional display, and

FIG. 7 is a schematic view of still another modification of the invention.

Figure 1:
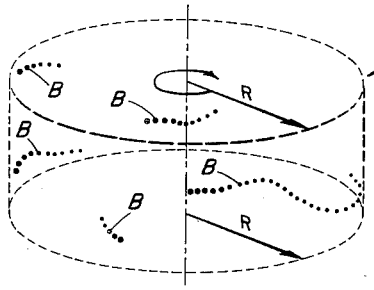
FIG. 1 is a schematic view showing a cylindrical display volume, and illustrating principles of operation of the present invention.

The display system of the present invention presents a large volume of information, has good resolution, and is able to present a controllable time history of a particular situation. FIG. 1 illustrates a cylindrical display volume A with a series of points that form individual trajectories B suspended in this volume. The heaviest point in each trajectory represents the current position of the object under observation. The remaining points display a selected portion of its past-time position history. It is desirable that the memory of the system—the persistence of the display—be variable over periods from seconds to hours. With this capability, an operator should be able to control the time-history display of an operational situation to avoid excess data display, and be able easily to detect trends in an operational situation.

The time required to display data after it is received must be kept to a minimum. It is obvious that the maximum number of points (volumetric resolution cells, hereinafter called cells) that can be used at any one time within the display is far less than the total cells available; otherwise the display would be saturated and useless. It is essential, however, that the system have access to all available volume resolution elements within the system reaction time, since one has no control over where objects are to appear. A system access time of one second was selected, thus permitting updating of all displayed information every second.

Data must also be identified easily and coded by class. Color was selected for coding, as being of greatest use to an operator, and in the present invention a capability of inserting symbols and markers has been provided. With these tools an operator can intervene effectively in a fast-changing high-density operational environment.

Figure 2:
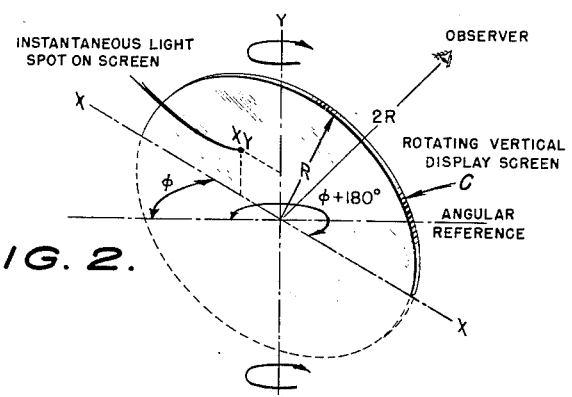
FIG. 2 is a schematic view of a rotatable vertical display screen.

There are a number of ways to generate a three dimensional (hereinafter called 3–D) effect. A rotating vertical display screen, such as is shown at C in FIG. 2, made of a semi-transparent light-diffusing substance such as frosted glass, is utilized. This screen is rotatable for scanning the entire volume of a sphere of radius R. If, every time the screen makes a single revolution, a small spot of light at the same angular position ($\phi$) imaged on the screen at location ($x, y$) is turned on and then turned off very rapidly, this spot will appear to an observer to be hanging literally in mid-air at the same location. Rotating the screen at 20 revolutions per second will remove any noticeable flicker as the spot is turned on and off once each revolution. The observer will not be aware of the screen itself since its rotational speed makes it invisible.

There are several important advantages inherent in the 3–D display of the present invention. It is truly 3-dimensional to the naked eye, requires no aids to vision, and can be observed from any position. The latter results from the semi-transparent nature of the screen material; the light spot (data point) is diffused by the surfaces so that it is scattered almost equally in all directions, with the exception perhaps of a small angle defined by the plane of the screen and its thickness.

Since the generation of a light spot is not an integral part of the display screen, the need for many commutators and slip rings, difficult to maintain but needed to turn on luminous screen elements, is eliminated. The data-generation technique is independent of the rotating display screen. The data generation requirements of sufficient light, resolution, memory, access time, and identification must be compatible with the display volume but do not impose conflicting requirements on the design of the display itself.

Inherently, as will be seen, this type of display has a four-color potential. At any discrete angular position of the display screen C, four independent quadrants—two at an azimuth angle of $\phi$ and two at an azimuth angle of $\phi + 180°$ on opposite sides of the screen—are available to image light spots of different colors. These may be viewed simultaneously from any position. This is illustrated more clearly by observing in FIG. 2 that only a semicircular screen is required to generate a spherical volume about the axis of rotation; the light spots need be imaged only on one side of the screen.

Referring again to FIG. 2, if we assume that regardless of the radius of the display chosen an observer would probably not want to view the display at a distance greater than twice this radius, we can determine approximately the size of the minimum resolution element on the display screen discernible to the eye of the observer. If we assume the resolution angle of the human eye to be about 1 angular mil, then the minimum observable resolution element should have a radius of $R/1000$.

Any object in the plane of the display screen C is defined in position by the same values of $x$ and $y$ at all angular positions of the screen. The area of this plane is $$A = \pi R^2 \qquad (1)$$

and the cross-sectional area of a single resolution element (previously defined) lying in the plane can be taken as $$A = \pi (R/1000)^2 \qquad (2)$$

Dividing Equation 1 by Equation 2 shows that this circular display plane contains ideally one million ($10^6$) $x, y$, resolution elements or cells. From the method of derivation, this number is independent of the actual size of the display radius R that is chosen. One thousand such vertical planes distributed equally in angle define a reasonable system angular resolution (azimuth) of 360/1000 (0.36 degree). Since each circular plane contains one million ($10^6$) resolution elements, the entire display volume will contain 1000 million ($10^9$). This is supported by considering the volume of an incremental resolution cell having a radius of $R/1000$ and dividing it into the volume of the display sphere. This gives a maximum availability of $10^9$ volumetric resolution elements regardless of the radius chosen for the display volume.

Figure 3:
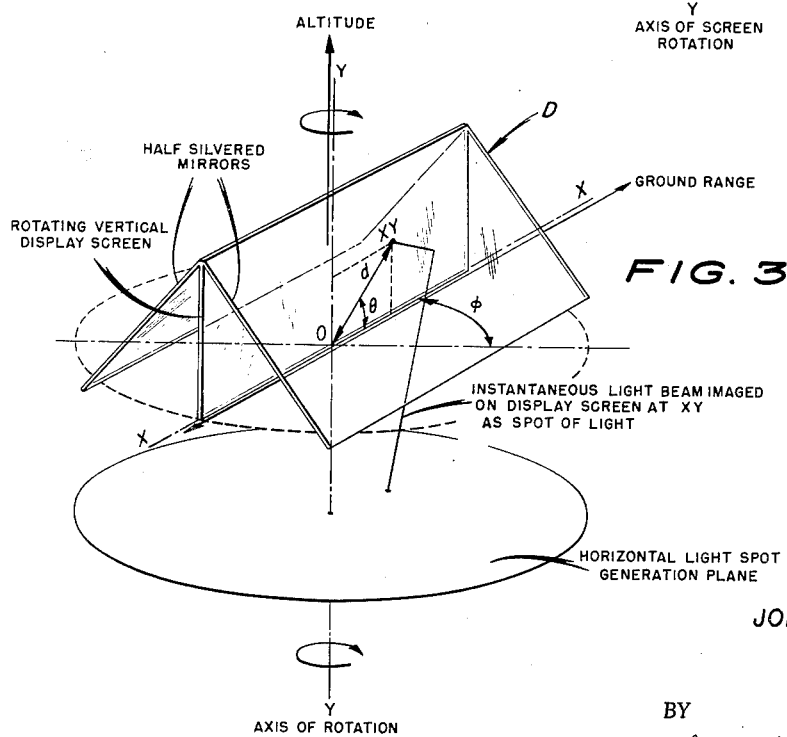
FIG. 3 is a schematic representation of a display screen according to a preferred embodiment of the invention.

The technique chosen to implement the display and to image light points on the screen, according to a preferred embodiment of the invention, is shown schematically in FIG. 3. Instead of the rotating circular display screen C, a rotatable rectangular screen D generates a cylindrical volume with both height and radius of R as it rotates. If, for example, it is assumed that the horizontal plane generated by the rotating X-axis of the display represents the surface of the earth, and the bottom center of the display (O) is taken as the coordinate origin, then the position of any object in altitude is determined by its height above the earth (Y) and its ground range by (X) at any regular azimuth position of ($\phi$) or ($\phi + 180°$) of the screen. If it is assumed that a minmum resolution cell has a radius of $R/1000$, 500 such cells can be placed side by side along the X and Y axis of the display screen. This, then, establishes resolution performance capability of the display in both ground range and altitude of 1 part in 500 for the display system. Target altitude and ground range can be easily derived from object radial range ($d$) and elevation ($\theta$).

Generation of the light spots gated rapidly on and off in time and in synchronism with the display rotation at desired azimuth angles is accomplished in a horizontal plane located directly under the display volume, as shown diagrammatically in FIG. 3. At any instant of time the location of the light spots appearing in this plane determine the altitude, ground range and color (to be discussed hereinafter) of any objects occurring at that discrete angular azimuth location of the display screen. In fact, this horizontal plane is an exact picture of both sides of the vertical display screen folded flat, and therefore contains $10^6$ resolution cells. The picture (spots of light) appearing at any instant in the horizontal plane is imaged on both sides of the vertical display screen by utilizing a simple projection-lens system and half-silvered mirrors. These mirrors serve to deflect by 90° the light rays projected from the light spots in the horizontal plane so that they are imaged on the vertical display screen and can be seen through the mirrors.

The display screen D is rotated at a speed of about 20 revolutions per second to avoid flicker. During each revolution of the screen there are 1000 discrete angular (azimuth) locations at which all objects (light spots) located in altitude and range may be seen. Thus, the screen spends a total time of 0.05 sec./1000, or 50 $\mu$sec. (50 millionths of a second) at each discrete angular position during a single revolution. In this instant there are approximately $10^6$ altitude-range positions that conceivably could require illumination to show objects at that angular location. This would mean that a single light spot could spend approximately only 50 nanoseconds at each one of the available 1 million altitude-range cells in order to scan them all in 50 μsec. at that angular location. This obviously would result in the display being saturated and unuseable at that position. A more realistic example might be to assume 25 objects, each being updated at a particular azimuth location, with latest position information every second. If desired, for other reasons previously discussed, to display about 10 minutes worth of memory on each object, then the light spot must illuminate 15,000 different positions for each revolution of the display (25 objects times 60 points per object per minute times 10) in 50 μsecs. This means that a single light spot could, on the average, dwell at each position only about $10^{-9}$ sec.

From these considerations of time and total number of points needing display, important conclusions can be reached for determining the techniques to be used for the data processing and insertion portions of the system of the present invention:

(1) The total number of data points that must be displayed in the short times involved ($10^4$ or $10^5$ points in $10^{-5}$ sec.) make single-channel, sequential, light-spot scanning systems that use cathode ray tubes and digital memories impractical.

(2) Analog techniques allowing use of many parallel channels, each having a controllable memory, offer a potential solution. High-capacity, two-dimensional displays, such as motion pictures and television, use such techniques.

A two dimensional data surface that could store data and at the same time could be used to provide a parallel channel light readout to the display will now be described, to aid in understanding the 3–D system. The techniques and principles of operation of such a data insertion and processing system can best be described by referring to FIG. 4. FIG. 4 shows a simple two-dimensional display system employing two closely-spaced data surfaces 10 and 12 made of aluminum coated Mylar. With an aluminum coating on one side, this normally transparent flexible plastic film forms an opaque data surface. After inserting a data point hole 14, 16 in each surface (by removing spots of the aluminum coating) so that these holes are directly aligned, light from a source 17 can pass through a lens 19 and through both holes and be imaged on a display screen 18 through a lens 20 and a half-silvered mirror 22 to represent a target coordinate point. The mirror 22, by virtue of its ability to let about half the light impinging on its surface pass through and reflect the other half, does not, therefore, significantly reduce the intensity of the light spot on the screen. Its mirror property is used to advantage to insert identification symbols from an auxiliary light source controllable in position.

To make the data point holes, an electric discharge from a rotating set of sparking points 24 onto the aluminum surface of the Mylar surfaces 10 and 12 is employed. By controlling the total energy in the sparking pulse (width, voltage, etc.) the hole size can be controlled quite easily. Typical pulse width of approximately 0.2 μsec. and 5000 volts in amplitude are being used. The spark generator may be a simple modulator that can be triggered readily from an external source. Such a generator is shown at 25, and the radar and computer system at 27.

To reduce the number of sparking points required to scan the complete data surface in one second, radial motion may be provided by an outside cam (not shown) and applied to the sparking arm as it rotates. In one second, each point on the sparking arm makes 20 revolutions. If the desired accuracy of data insertion is one half a minimum resolution element, then in 20 revolutions, or one second, each point is made to move a radial distance of 10 resolution diameters. Since a total of approximately 500 resolution cells are required radially, 50 sparking points are sufficient on each sparking arm to scan the entire data surface area in one second. This is the desired system reaction time.

If the holes 14 and 16 are to align properly in angle, the timing accuracy must be related to the maximum useable radius of the data surface and to the minimum resolution element of radius $R/1000$. The circumference of the useable display area is given by $2\pi R$, so there are $2\pi R/(2R/1000)$, or $1000\pi$ resolution elements scanned every 0.05 sec. by the outermost sparking point. Consequently, to locate the holes in angle to half a resolution cell requires system timing accuracy of $(0.20)(0.5)(1/\pi \times 10^3) \cong 8$ μsec.

Again referring to FIG. 4, memory, or display persistence, is controlled by moving the data surfaces 10 and 12 at a controllable rate in opposite directions, as indicated by the large arrows. This action serves two purposes. It erases old points from the display by destroying the hole alignment between the two surfaces; in this way, new data points on a trajectory are perfectly aligned and old points gradually disappear. It introduces a fresh, unused data surface memory to the system, thus preventing the display system from becoming saturated.

The rate at which the surface is required to move is determined by the memory time needed in the display and the size of a minimum resolution cell. This rate is the minimum resolution cell diameter ($2R/1000$) on the data surface divided by the memory time. If the minimum resolution cell is 0.005 in diameter on the display data surface and the memory time required is 5 min., the rate of tape usage would be 0.001 in. per min. or 1.0 in. each 1000 min. If the full display capacity must be available at all times, the tape speed must be $2R$/memory time. This is 1000 times faster than that required to erase points. If complete independence is required between desired memory time and display capacity, it is possible to have a double channel memory system in which either or both systems can display points on the screen.

The basic techniques and principles of operation just discussed for the simple, two dimensional display system of FIG. 4 apply equally as well to a combined two dimensional and three dimensional display system. The implementation shown, however, is not suitable for the 3–D display since there are no provisions for rapidly gating the light spot on and off in proper synchronism with the rotational speed of 20 c.p.s. of the 3–D display.

FIG. 5 illustrates schematically the basic techniques and principles of operation of the combined two dimensional and 3–D general purpose display system, which constitutes a modification of the present invention. In order to gate the light spot on and off in time, a light spot nutator 26 made of coherent fiber optics is inserted between the two data surfaces. Coherent fiber optics are a solid mass of many small-diameter parallel glass fibers, each having a diameter of approximately 0.001 in. When bundled together, these fibers act as independent light pipes or guides.

If, for example, small spots of light are imaged on one face of the coherent bundle constituting the nutator 26, i.e., on the ends of the individual glass fibers, the light will be conducted almost perfectly and with negligible loss, illuminated only by the glass fibers, and will appear as light spots imaged precisely at the same location on the opposite face of the bundle. If, as shown in FIG. 5, the nutator comprising the fiber optics bundle is placed between the two data surfaces 10 and 12 so that the center glass fiber, and consequently all other fibers in the bundle are not parallel but at an angle to the axis of rotation, the following results are obtained.

(1) If the nutator is rotated about the rotation axis defined by a dotted line connecting the intersection of $X_1Y_1$ on the data surface 10, and $X_2Y_2$ on data surface 12, any hole continuously illuminated by light from the source 17, such as the hole 28 on the data surface 10, will paint a light spot, via the fiber optics, on the data surface 12 having a locus forming a circle of radius R.

(2) The position $(x_2y_2)$ of the light spot on the surface 12 at any instant of rotation defined by $\phi$ can be determined from the following simple transformation equations, $$X_2 = X_1 + r \cos \phi, \text{ and } Y_2 = Y_1 + r \sin \phi$$

where $r = d \tan \phi$ and $\phi$ is defined by the angular position of the center glass fiber of the nutator 26 with respect to the display angular reference. These equations illustrate that the center of the light circle painted on the data surface 12 is located at the same position $(x_1y_1)$ of the hole 28 on the data surface 10.

(3) If a second hole 30, is shown in FIG. 5, is placed at some position $(x_2y_2)$ on the data surface 12 defined by the above equations, and thereby located at some position on the circular path, the light spot will trace as the fiber optics bundle nutator 26 rotates; the light can thus be effectively gated on and off. The continuous light beam passing through the hole 28 can pass through the hole 30 only once during each revolution of the fiber optics bundle nutator 26.

By rotating the nutator 26 in synchronism with the 3-D display, the light spot can be imaged on the screen 18 only via the lens 20, the mirror 22, an image tube 32, a half-silvered mirror 34, and a projection lens 36, on the display screen at one angular azimuth position, and altitude and range (determined by $X_1$, $Y_1$) once each revolution. A second fiber optics nutator 38, shown in FIG. 5, is required to transform the coordinates $(X_2, Y_2)$ back to the original coordinate positions $(X_1, Y_1)$ with respect to the center of rotation, before projection to the display screen 18. Since 1000 discrete azimuth locations are required for display resolution, the circumference of the scanning light circle must contain at least 1000 minimum resolution elements. Since the diameter of a minimum cell is $2R/1000$, the circumference of the scan circle must be $2R$ and the distance R, shown in FIG. 5 as the center fiber offset from the axis of rotation, must be equal to $R/\pi$.

FIG. 5 also illustrates the manner in which the two dimensional display is integrated with the 3-D display. The image tube 32 has been added in the light path before projecting the light to the display screen 18. The 3-D display system of FIG. 5 obtains its image from the half-silvered mirror 22 and projects it onto the semi-transparent display screen D with the aid of an angularly disposed half-silvered mirror 40, a half-silvered mirror 42, and a projection lens 44. The display screen D comprises a vertically disposed rotatable rectangular element 46 and half-silvered rectangular mirrors 48 and 50 which have meeting edges connected to a confronting edge of the element 46 at angles of 45 degrees thereto. The screen D is rotated, about the axis shown by the broken line 52, by a suitable motor (not shown). Using the same data processing system for both displays makes it possible to readily gate trajectories being displayed anywhere on the two dimensional screen 18 in time, and to use the light-modulation capability of the image tube 32 to insert different identification symbols for each object being displayed.

FIG. 6 illustrates the planned complete display system. In this view the light source is shown at 54, the reflector at 56, and the condensing lens at 58. A data surface support plate 60, of rectangular shape and constituted by a coherent fiber optics assembly, is positioned with its center on the axis 52 and in spaced relation to the lens 58. An aluminum coated Mylar data surface, corresponding to the data surface 10 in FIGS. 4 and 5, is shown at 62, and has its end portions trained about spools 63 and 64. As will be seen, the surface 62 is positioned for movement on the surface of the support plate 60 remote from the lens 58. A similar data surface 65, corresponding to the data surface 12 in FIGS. 4 and 5, is positioned to move over the surface of a support plate 66 which, like the plate 60, is constituted by a coherent fiber optics assembly. A third data surface 68 has been added, the need for it becoming apparent when the number of target trajectories being displayed by a two-surface system is considered. As different trajectories cross one another, false trajectories can be generated. By using three surfaces, the possibility of a false trajectory is minimized as only false points can occur. Since it is an objective of the system to display target trajectories, it is necessary only to keep the number of false points low. By using 100% of the data surface area (or about 100,000 target points), the number of false points will be about 0.1% of the total number of points displayed. The surface 68 is similar to the surfaces 62 and 65 and is supported by a data surface support plate 70, similar to the plates 60 and 66. Positioned on the axis 52, between the surface 68 and the display D and in axial spaced relation, are a rotatable three-color wheel 72, a half-silvered mirror 74, and a projection lens 76. Mounted in end-to-end relationship and bowed, or skewed, with respect to the axis 52, are inverted L-shape oblong, generally rectangular fiber optics assemblies 78, 80, and 82. As seen in FIG. 6, the assembly 78 is located between the data surface 62 and the support plate 66, the assembly 80 between the data surface 65 and the plate 70, and the assembly 82 between the data surface 68 and the color wheel 72.

The principle of operation of the rotating fiber optics nutator assemblies is the same as in FIG. 5. Color is inserted by a transparent three-color wheel (shown at 72 in FIG. 6) that rotates in synchronism with the fiber optics and display. This can be better understood by remembering that an image on the display screen is really a vertical image of the last horizontal data surface via the projection lens and half-silvered mirrors inclined at a 45° angle. If a display screen is placed parallel to the last data surface (plane) and directly above the 3-D display, substantially as shown in FIG. 5, a perfect, rotating, focused image of the color wheel and any instantaneous point of light appearing at the surface of the fiber optics assembly 38 will appear on the screen. The 45°, half-silvered mirrors 22 and 40 take half of this horizontal image and place it without distortion on its side of the display screen.

The skewed coherent fiber optics arrangement shown in FIG. 6 is 1.0 in. square and has fibers about 1.5 in. long and 10 microns in diameter.

This technique of color insertion utilizes the four-color capability inherent in the display itself and means that each of the rotating fiber optics assemblies may be divided into four imaginary longitudinal sections, as shown in FIG. 6, resulting in the inverted L-shaped contour. Each section is always reserved for a single color. It should be noted that one section of each fiber optics assembly is eliminated to allow the insertion of data insertion sparking points. The points, of sector shape, are shown at 84, 86, and 88. This structure prevents the radial sparking arm, shown at 24 in FIG. 3, from passing in front of the data surface at a time when it will interfere with the passage of light and prevent projection of data points on the screen.

The fiber optics assemblies 78, 80, and 82 are arranged so the three holes required on three successive surfaces from the vertices of an equilateral triangle, thereby giving the data insertion system a threefold symmetry. This can be seen from the following data transformation equations:

Data surface No. 62:

$$H_1 = (X_1 Y_1)$$

where $$X_1Y_1 = f$$

azimuth, elevation, range and desired color);

Data surface No. 65:

$$H_2 = (X_2Y_2)$$

where $$X_2 = X_1 + r \cos \phi$$

and $$Y_2 = Y_1 + r \sin \phi$$

Data surface No. 68:

$$H_3 = (X_3Y_3)$$

where $$X_3 = X_2 + r \cos (\phi + 120°)$$

and $$Y_3 = Y_2 + r \sin (\phi + 120°)$$

(center reference fiber of bundle No. 80 advanced 120° from bundle No. 78);

A fourth data surface (position of a spot of light on the surface of the fiber optics bundle 82):

$$X_4 = X_3 + r \cos (\phi + 240°) = X_1$$

and $$Y_4 = Y_3 + 2 \sin (\phi + 240°) = Y_1$$

(center reference fiber of bundle No. 82 advanced 240° from bundle No. 78).

Color addition only: return of the coordinate system to the required system around the axis of rotation to permit proper imaging on the display screen.

Experimental investigations have also been conducted using a moderate-power ruby laser (not shown) to supply energy through the fiber optics assemblies to burn a hole simultaneously through the three data surfaces. Another interesting possibility is the use of photochronic materials that change from an opaque to a clear state when exposed to light of certain wavelengths.

FIG. 7 shows an experimental system that has been successfully used to display synthetic aircraft and satellite trajectories circling the earth.

The display screen itself, shown at 90, is 7 in. wide and 3.5 in. high. A 3.5 magnification is supplied by a projection-lens system 92 having a focal length of about 6 in. and a light-gathering aperture of about 2.8 in. A light source is shown at 93, a reflector at 95, and a suitable hemispherical plastic dome at 97.

The projection of the rectangular screen 90 back onto the rotating data surface shown at 94, is a 2.0 in. square covering a 2.8 in. diameter circular area on a manually adjustable fixed data surface 96. Holes 98 ranging in sizes from 10 mils to about 4 mils in diameter have been successfully displayed on the screen in three dimensions. A 4-mil hole size results in an altitude and range resolution of 1 part in 250. If the maximum range of the display is set at 100 nautical miles and altitude at 50,000 ft., this results in a range resolution of 2400 ft. and an altitude resolution cell of 200 ft.

Because of magnification a hole size of 4 mils on the data surface 96 yields a light spot 14 mils in diameter on the display screen 90. The minimum discernible spot size in radius, as derived earlier, would be $R/1000$ where R is 3.5 in.; this would be a spot with a 7-mil diameter.

There has been no difficulty in observing trajectories on the screen 90, using the 14-mil resolution cell which subtends about 2 angular mils at the eye when viewing the display at about 7 inches from the center. Light from a 750-watt projection bulb, i.e., the source 93, has been found adequate in only a moderately darkened room. Data points in a trajectory separated by less than half a resolution cell are easily discernible.

A number of screen materials other than frosted glass have been tried. So far the most satisfactory material found has been ordinary drawing vellum. Data surfaces of thin metal, drilled, and surfaces of aluminum-coated glass sparked manually, have been successfully used to place points in the display.

Color codes of red, green, and white have been successfully used on the rotating data surface 94. Blue has been found hard to discern from green, and is low in light intensity.

As predicted, the display is easily visible from all sides, and the angle where vision is restricted by the plane of the screen 90 is hardly noticeable. There is a small amount of blocking of light due to posts supporting the half-silvered mirrors and there are some slight refraction effects when viewing part of a trajectory through the half-silvered mirror and the other part through air. The half-silvered mirrors cause a 77% reduction in light by a factor of approximately 4. These effects have been completely eliminated by building another display similar to the one shown in FIG. 1 but using a single full-silvered mirror on one side of the screen only.

Actual results obtained from the display have verified that the display technique and the basic method of inserting data utilizing surfaces with holes is feasible and meets predicted performance objectives.

Obviously many modifications and variations of the present invention are possible in the light of the above teachings. It is therefore to be understood that within the scope of the appended claims the invention may be practiced otherwise than as specifically described.

What is claimed is:

1. In a radar display system for simultaneously displaying a plurality of radar target images in more than one dimension,
   a plurality of data surfaces,
   a display screen,
   means for rotating the display screen for scanning the volume of a sphere,
   said data surfaces being relatively movable and having metal-coated surfaces,
   means for electrostatically forming holes in the data surfaces, said holes being representative of target positions, and
   means for projecting images of the positions on the display screen,
   said last-mentioned means comprising a light source, a lens system and a half-silvered mirror,
   said lens system including a nutator consisting of a fiber optics assembly adjacent each of the data surfaces.

2. A radar display system for simultaneously displaying a plurality of radar target images in more than one dimension, including, in combination with a radar, a computer, and a high voltage source,
   a plurality of data surfaces each having a metal coating,
   said data surfaces being movable with respect to each other,
   a rotatable display screen spaced from the data surfaces,
   sparking points movable over the data surfaces and connected to the high voltage source, the radar and the computer,
   said sparking points forming holes in the data surfaces representative of target positions obtained from the radar and computer, and
   means for projecting on the display screen images formed by said holes,
   rotation of said display screen causing said images to appear thereon in multiple dimension.

3. The combination recited in claim 2, wherein said last-mentioned means comprises a light source, a lens system and a half-silvered mirror.

4. The combination recited in claim 2, wherein said last-mentioned means comprises a light source, a lens system and a half-silvered mirror, said lens system including a nutator comprising a fiber optics assembly adjacent each of the data surfaces.

5. The combination recited in claim 2, wherein said display screen comprises a rotatable rectangular element and two half-silvered rectangular mirrors having meeting edges connected to a confronting edge of the rectangular element at angles of a given value and connected to each other at an angle of another given value.

6. The combination recited in claim 5 including additionally
a nutator consisting of a plurality of fiber optics assemblies,
one of said assemblies being mounted adjacent each data surface.

7. The combination recited in claim 6, wherein the assemblies are skewed with respect to the axis of the lens system, and including additionally a support plate for each of the data surfaces.

8. The combination recited in claim 5, wherein the display screen is rotatable on an axis normal to the axis of the lens system.

9. The combination recited in claim 8, including additionally a color wheel rotatable on the axis of the lens system in synchronism with the nutator and the sparking points.

10. A radar display system for simultaneously displaying a plurality of radar target images in three dimensions, including, in combination with a radar system and a high voltage source,
a light source,
a reflector for the light source,
a lens system mounted on the same axis as the reflector,
a display screen mounted in spaced relation to the light source and positioned to receive a beam of light from said source,
said display screen being rotatable about an axis normal to the axis of the lens system and reflector,
three data surfaces mounted between the light source and the display screen,
said data surfaces being mounted in spaced relation to each other and to said screen and in the path of a light beam from said source, being relatively movable, and having metal coatings thereon,
a support plate for each of said data surfaces,
a color wheel rotatably mounted on the same axis as the lens system,
a rotatable fiber optics assembly mounted between one of the data surfaces and an adjacent support plate,
a second rotatable fiber optics assembly mounted between the second data surface and an adjacent support plate,
a third rotatable fiber optics assembly mounted between the third data surface and the color wheel,
each of said support plates being constituted by a fiber optics assembly,
a half-silvered mirror between the color wheel and the display screen, and
means connected with said high voltage source for forming holes in the display surfaces,
said holes being representative of target positions obtained from the radar system,
said assemblies, said support plates and said lens system cooperating with said half-silvered mirror for projecting light beam images on said display screen,
rotation of said display screen causing said images to appear thereon in three dimensions,
said color wheel being rotatable in synchronism with said assemblies and imparting color to said images.

11. The combination recited in claim 10, wherein said color wheel includes three sectors of different colors, whereby images of different colors will appear in different quadrants on the display screen.

12. The combination recited in claim 10, wherein the assemblies are arranged in alignment but skewed with respect to the axis of the lens system.

13. The combination recited in claim 10, wherein said means comprises sparking points mounted on the assemblies to rotate therewith.

14. The combination recited in claim 10, including additionally a two-dimensional display screen, and
means for projecting a two-dimensional image from said light source and data surfaces onto said two dimensional display screen.

15. A radar display system capable of simultaneously displaying a plurality of target images in more than one dimension, comprising,
a display screen,
a pair of data surfaces arranged in longitudinal spaced relation and being movable relative to one another,
means for placing indications on the data surfaces representative of multiple target positions, one indication being placed on each of said data surfaces for each target position, whereby the indications for a particular target position are displaced from one another as a function of time, and
means for projecting an image of said indications on said display screen including a lens system.

16. A radar display system capable of simultaneously displaying a plurality of target images in more than one dimension, comprising,
a display screen,
a plurality of data surfaces arranged in longitudinal spaced relation and being movable relative to one another,
means for placing indications on the data surfaces representative of multiple target positions, and
means comprising a light source, a lens system and a half-silvered mirror for projecting an image of said indications on said display screen.

17. A radar display system capable of simultaneously displaying a plurality of target images in more than one dimension, comprising,
a rotatable display screen made of a semi-transparent light-diffusing substance for scanning a display volume,
a plurality of data surfaces movable relative to one another,
means for forming light conductive openings in said data surfaces as indications representative of multiple target positions, and
means comprising a light source, a lens system and a half-silvered mirror for projecting an image of said openings on said display screen,
said image being periodically interrupted at a rate synchronized with the rate of rotation of said display screen, whereby the image is caused to appear to an observer to be suspended in mid-air within the scanned volume.

18. A radar display system as recited in claim 17, including electrostatic means adjacent the data surfaces for forming the openings therein.

19. A radar display system capable of simultaneously displaying a plurality of target images in more than one dimension, comprising,
a display screen,
a plurality of data surfaces each formed of normally transparent plastic film coated with aluminum,
means for placing indications on the data surfaces representative of multiple target positions, and
means for projecting an image of said indications on the display screen.

20. A radar display system capable of simultaneously displaying a plurality of target images in more than one dimension, comprising,
  a display screen,
  a plurality of data surfaces arranged in longitudinal spaced relation and being movable relative to one another,
  means for placing indications on the data surfaces representative of multiple target positions, and
  means comprising a light source, a lens system and a half-silvered mirror for projecting an image of said indications on the display screen,
  said lens system including a nutator comprising a fiber optics assembly adjacent at least one of the data surfaces.

References Cited by the Examiner
UNITED STATES PATENTS

| | | | |
|---|---|---|---|
| 2,434,897 | 1/48 | Ayres | 343—7.9 |
| 2,655,836 | 10/53 | Sherwin | 343—10 X |
| 2,969,537 | 1/61 | Mannheimer et al. | 343—11 |
| 2,998,481 | 8/61 | Forman | 343—10 X |
| 3,079,585 | 2/63 | Perry et al. | 343—7.9 X |
| 3,090,043 | 5/63 | Wilkenson. | |
| 3,097,261 | 7/63 | Schipper et al. | 343—7.9 X |
| 3,109,060 | 10/63 | Beach et al. | |
| 3,138,796 | 6/64 | Withey | 343—7.9 |
| 3,140,415 | 7/64 | Ketchpel | 343—7.9 X |

CHESTER L. JUSTUS, *Primary Examiner.*